United States Patent [19]

Basteck

[11] Patent Number: 5,733,076
[45] Date of Patent: Mar. 31, 1998

[54] ROTATING SHANK-TYPE TOOL

[76] Inventor: Andreas Basteck, 71686 Remseck, Oberen Schlossberg, Germany

[21] Appl. No.: 497,456

[22] Filed: Jul. 3, 1995

[30] Foreign Application Priority Data

Jul. 2, 1994 [DE] Germany .................. 44 23 249.7
Jun. 19, 1995 [DE] Germany .................. 195 22 141.9

[51] Int. Cl.$^6$ ................................................ B23B 51/06
[52] U.S. Cl. ........................... 408/59; 408/144; 408/227
[58] Field of Search .............................. 408/57, 59, 56, 408/144, 227

[56] References Cited

U.S. PATENT DOCUMENTS

| | | | |
|---|---|---|---|
| 3,313,186 | 4/1967 | Rochon | 408/59 |
| 3,460,410 | 8/1969 | Briles | 408/57 |
| 3,543,613 | 12/1970 | Obloy | 408/57 |
| 3,701,606 | 10/1972 | Bogsten | 408/59 |
| 4,032,250 | 6/1977 | Lavallee | 408/59 |
| 4,113,405 | 9/1978 | Dillinger | 408/57 X |
| 5,163,790 | 11/1992 | Vig | 408/57 |

FOREIGN PATENT DOCUMENTS 1336104  12/1963  France .

*Primary Examiner*—Daniel W. Howell
*Assistant Examiner*—Henry W. H. Tsai

[57] ABSTRACT

The invention relates to a rotating shank-type tool (11) with a shank (12), in which at least one main channel (21) for coolant/lubricant extends in the longitudinal direction of the shank and from which, in the end region of the main channel, at least one branch channel (22) leads outward and forms a mouth (23). A cutting head (13) is connected to the shank (12) and has chip grooves (15) and a groove run-out region (16). A sleeve (19) engages over the mouth (23). The end region of the sleeve (19) covers at least the groove run-out region (16) of the cutting head (13). The branch channel mouth (23) is positioned in the shank at a distance from the cutting head (13).

15 Claims, 1 Drawing Sheet

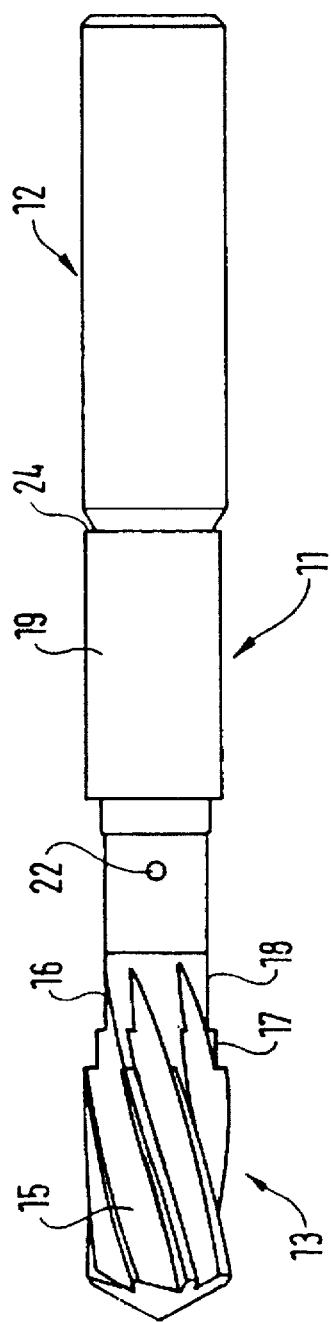
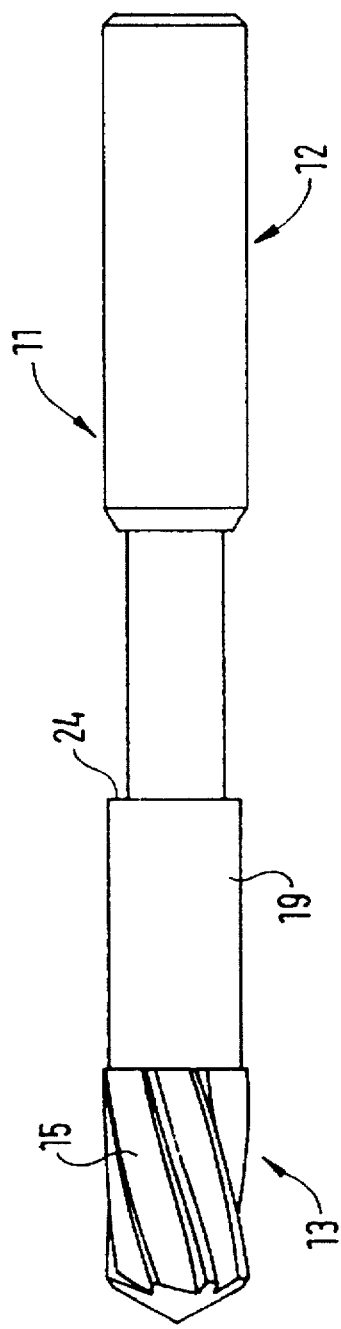
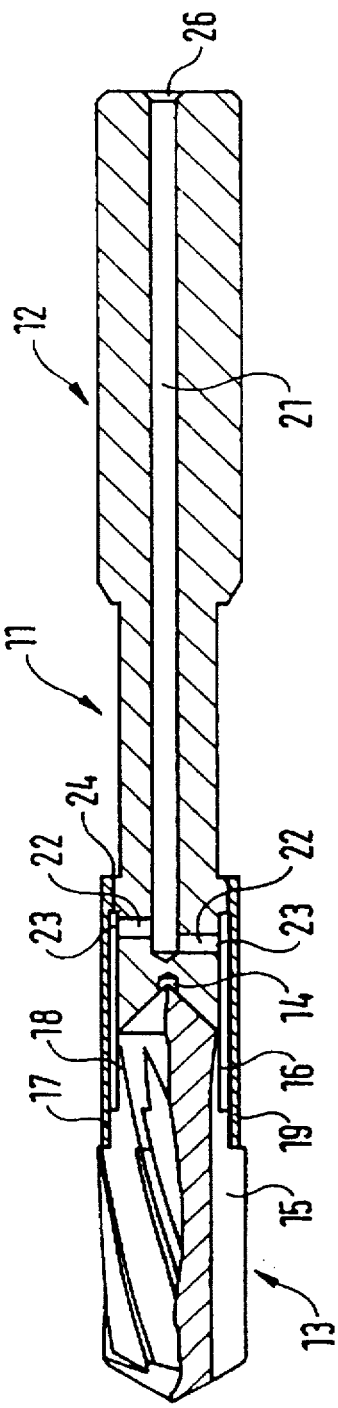

ROTATING SHANK-TYPE TOOL

BACKGROUND OF THE INVENTION

1. Field of the Invention

The Invention relates to a rotating shank-type tool having at least one main channel for collant/lubricant extending in a longitudinal direction and having an end region, from which at least one branch channel leads outward and forms a mouth.

2. Description of Prior Art

EP 0,556,801 A1 discloses a rotating shank-type tool which consists of a cylindrical shank and of a cutting head attached to the shank. Chip grooves are made in the cutting head designed as a shaping head and are followed by a groove run-out region. Provided in the latter concentrically to the cylindrical shank is a main channel for coolant/lubricant, from which, in its end region near the shaping head, at least two branch channels lead perpendicularly outward and each form a mouth there. This is arranged in each case in the groove run-out region which is surrounded by a sleeve. The sleeve extends from the shank as far as the shaping head.

In principle, the shank of rotating shank-type tools is formed from a softer and, furthermore, cheaper material and the shaping head is formed from a material of higher quality. However, one problem in such a design is that, when the chip grooves are being made, the cutting tool for producing the chip grooves engages into the two materials, that is to say both into the material of the shank and into the material of the shaping piece. Thus, damage to the cutting tool occurs as a result elf particles carried with it out of the softer material, thereby impairing the quality of the cutting grooves and consequently of the shank-type tool. However, if the shaping head is provided both with the chip grooves and with the production-related run-out region of the chip grooves and the mouths are likewise arranged in this run-out region, then the bore for the branch channels must be driven both through the material of the shaping head and through that of the shank. In view of the different materials, this is another disadvantage. Moreover, the shaping head is additionally weakened in this region.

SUMMARY OF THE INVENTION

The object of the invention is to provide a rotating shank-type tool of the type described, which, whilst avoiding the disadvantages mentioned, allows simple production and has improved strength.

This object is achieved by means of a rotating shank-type tool with a shank, in which there is provided at least one main channel for coolant/lubricant that extends in the longitudinal direction and from which, in its end region, at least one branch channel leads outward and forms a mouth. A cutting head is connected to the shank and has chip grooves and a groove run-out region. A sleeve engages over the mouth. The end region of the sleeve covers at least the groove run-out region of the cutting head, and the branch channel mouth is positioned in the shank at a distance from the cutting head. The cutting head is now provided both with the chip grooves and with a groove run-out region and the shank is provided with the mouth of the branch channel at a distance from the cutting head. This allows simpler production, and the manufacturing tools can in each case be adapted optimally to the material to be machined. An end region of the sleeve covers part of the cutting head, so that a positive flow of the coolant/lubricant emerging from the mouth while the shank-type tool is in operation, at least to the cutting head, is obtained.

According to a further embodiment of the invention, an annular gap is formed at least in regions between the sleeve and the shank, that is to say the surface of the shank and the wall of the sleeve are not profiled in this region. The coolant/lubricant can thus be distributed unimpeded in this region in the circumferential direction and subsequently flow in the longitudinal direction of the shank.

As already mentioned above, it is a disadvantage if the cutting tool for making the chip grooves engages both into the hard material of the cutting head and into the relatively soft material of the shank. It is therefore beneficial to provide the groove run-out region solely in the cutting head. This is the case particularly when the shaping head is produced from the material of the cutter.

So that the coolant/lubricant flowing out of the mouth of the branch channel flows essentially completely in the direction of the cutting head with its cutting grooves, the sleeve, on its side remote from the cutting head, engages sealingly onto the shank. For this purpose, in particular, the sleeve is provided with an inner collar, so that it sits on the shank via the inner collar in this region.

High cutting loads on the rotating shank-type tool occur primarily in the region of the cutting head. According to one embodiment, therefore, it is advantageous if the mouth of the branch channel is at a considerable distance from the region of transition of the cutting head/shank, so as not to weaken this critical region unnecessarily by the branch channels.

The region weakened by the bore and the region, critical per se, of transition from shank to cutting head can be reinforced in that the sleeve rests in regions on the cutting head.

BRIEF DESCRIPTION OF THE DRAWINGS

Further advantages and features of the invention form will be understood from the following description in which:

FIG. 1 shows a side view of the rotating shank-type tool, in which the sleeve is in a first position;

FIG. 2 shows a side view of the rotating shank-type tool, in which the sleeve is in a second position;

FIG. 3 shows a sectional view of the rotating shank-type tool.

DETAILED DESCRIPTION OF PREFERRED EMBODIMENTS

FIGS. 1 to 3 illustrate a rotating shank-type tool 11 which has a cylindrical shank 12 and a cutting head 13 soldered to the cylindrical shank 12. The cutting head 13 is arranged coaxially to the cylindrical shank and adjoins the latter. The cutting head 13 engages with its conical end into a corresponding recess on one end face of the shank 12 and is soldered to the latter. For manufacturing reasons, the recess is provided with a centering bore 14.

The cutting head 13 described below is produced as a shaping head from a cutting material. Alternatively, there can be provided a cutting head 13 which is formed from a material of lower quality, on which inserted cutting bits are provided. This embodiment is particularly advantageous in the case of cutting heads having a relatively large diameter, for example from 15 mm.

The cutting head has chip grooves 15 which are followed by a run-out region 16 of the chip grooves 15. The transition from the chip grooves 15 to the run-out region 16 of the chip grooves 15 is formed by steps 17 and 18 of the groove walls, the run-out region 16 of the chip grooves 15 being made solely in the cutting head 13.

The shank 12 is provided with a smaller diameter near the cutting head 13. In this region, there is mounted on the shank 12 a sleeve 19 which is displaceable over the region of the shank 12 having the smaller diameter.

The shank 12 has a main channel 21 extending concentrically to the longitudinal axis. The main channel 21 branches, in its end region near the cutting head 13, into two branch channels 22 which extend perpendicularly to the main channel 21 and which lead outward and there each form a mouth 23. The mouths 23 of the branch channels 22 are made in the shank 12 at a considerable distance from the region of transition of the cutting head/shank, as can be inferred very clearly from FIG. 3. Furthermore, the branch channels 22 are arranged offset in relation to the longitudinal axis of the shank 12 in the end region of the main channel 21, so as not to weaken the shank 12 excessively.

For manufacture, the sleeve 19 is arranged according to FIG. 1, that is to say, the mouths 23 of the branch channels 22 are freely accessible. In this position of the sleeve 19, the chip grooves 15 are cut into the cutting head 13. The run-out region 16 is then also obtained during this operation.

When the chip grooves 15 have been worked into the cutting head 13, the sleeve 19 is displaced to the left according to FIGS. 2 and 3, thus engages over the mouths 23 of the branch channels 22 and covers part of the shaping head 13, in that the sleeve 19 rests with its region facing the cutting head 13 on the step 17.

The side of the sleeve 19 remote from the cutting head 13 is provided with an inner collar 24, via which the sleeve 19 sits on the shank 12.

The region of the shank 12 which is on the right in relation to FIGS. 1 to 3 and which has a diameter larger than that of the remaining region of the shank 12 serves for the clamping of the shank-type tool 11. The main channel 21 has, on the right end face of the shank 12, a mouth 26 which is connected to a coolant/lubricant source. Via the main channel 21, coolant/lubricant is conveyed to the branch channels 22 while the rotating shank-tool 11 is in operation. Via the branch channels 22 and their mouths 23, the coolant/lubricant enters the annular gap formed between the sleeve 19 and the shank, is uniformly distributed in a circumferential direction and subsequently flows solely in the direction of the cutting head 13, since a sealing closure between the sleeve 19 and the shank 12 is provided by the inner collar 24 of the sleeve 19. The coolant/lubricant then enters the run-out region 16 of the chip grooves 15 and thereafter the chip grooves 15.

An alternative embodiment not shown in the figures has a non-positive and/or positive connection between the cutting head 13 and shank 12. This connection can, for example, be non-positive a tongue/groove connection a positive connection which has a press fit. In this embodiment, the sleeve 19 can be formed in one piece onto the shank 12, thereby affording a simple manufacture of the rotating cutting tool according to the invention.

A rotating shank-type tool 11 of this type is suitable particularly for reaming. In this case, the shank-type tool can have a rotational speed up to and above 10,000 rpm.

The invention is thus characterized in that, on one side, the cutting head 13 with the chip grooves 15 and with the run-out region 16 of the chip grooves 15 is made separate from the shank 12 having the mouths 23 of the branch channels 22. This results in the manufacturing advantages mentioned in the introduction, since the manufacturing tools can now be adapted optimally to the material of the cutting head 13 and of the shank 12 respectively.

I claim:

1. A rotating shank-type tool (11) comprising:

a shank (12) having at least one main channel (21) for coolant/lubricant extending in a longitudinal direction of said shank (12) and having an end region from which at least one branch channel (22) leads outward and forms a mouth (23), a cutting head (13) connected to said shank (12) having chip grooves (15) and a groove run-out region (16) associated with said chip grooves (15), a sleeve (19) surrounding said shank (12), and engaging over said mouth (23), and an annular gap formed at least in a region between said sleeve (19) and said shank (12), wherein said end region of said sleeve (19) covers at least said groove run-out region (16), and said branch channel mouth (23) is positioned in said shank (12) at a distance from said cutting head (13).

2. The rotating shank-type tool according to claim 1, wherein said run-out region (16) is provided solely in said cutting head (13).

3. The rotating shank-type tool according to claim 1, wherein said sleeve (19), on its side remote from said cutting head (13), engages sealingly onto said shank (12).

4. The rotating shank-type tool according to claim 3, wherein said sleeve (19), on its side remote from the cutting head (13), has an inner collar (24) that sits on said shank (12).

5. The rotating shank-type tool according to claim 1, wherein said branch channel mouth (23) is positioned at a considerable distance from a region of transition between said cutting head and said shank.

6. The rotating shank-type tool according to claim 1, wherein said sleeve (19) rests in regions on said cutting head (13).

7. The rotating shank-type tool according to claim 1, wherein said cutting head (13) and said shank (12) are integrally connected to each other.

8. The rotating shank-type tool according to claim 1, wherein said cutting head (13) and said shank (12) are non-integrally connected to each other.

9. The rotating shank-type tool according to claim 1, wherein said cutting head (13) and said shank (12) are permanently connected to each other.

10. The rotating shank-type tool according to claim 1, wherein said cutting head (13), and said shank (12) are adapted to one another in a region in which said cutting head (13) is connected to said shank (12).

11. The rotating shank-type tool according to claim 8 or 9, wherein said sleeve (19) is formed in one piece with said shank (12) on an end of said shank (12) closest to said cutting head (13).

12. The rotating shank-type tool according to claim 1, wherein said cutting head (13) comprises a shaping head formed of a cutting material.

13. The rotating shank-type tool according to claim 1, wherein said cutting head (13) comprises a shaping head formed of a non-cutting material and having cutting bits inserted therein.

14. The rotating shank-type tool according to claim 1, wherein said tool is used as a reaming tool.

15. A rotating shank-type tool (11) comprising:

a shank (12) having at least one main channel (21) for coolant/lubricant extending in a longitudinal direction of said shank (12) and having an end region from which a plurality of branch channels (22) lead outward and form mouths (23) and are arranged longitudinally offset in relation to the longitudinal direction of said shank (12), a cutting head (13) connected to said shank (12) having chip grooves (15) and a groove run-out region (16) associated with said chip grooves (15), and a sleeve (19) engaging over said mouths (23), wherein said end region of said sleeve (19) covers at least said groove run-out region (16), and said branch channel mouths (23) are positioned in said shank (12) at a distance from said cutting head (13).

* * * * *